United States Patent [19]
Schnürle

[11] 3,799,232
[45] Mar. 26, 1974

[54] WEAR LINK FOR TIRE CHAINS
[75] Inventor: Werner Schnürle, Dewangen, Germany
[73] Assignee: Eisen-und Drahtwerk Erlau Aktiengesellschaft, Erlau, Aalen, Germany
[22] Filed: Mar. 15, 1972
[21] Appl. No.: 234,878

[30] Foreign Application Priority Data
Mar. 24, 1971 Germany .......................2114206

[52] U.S. Cl................................. 152/231, 152/243
[51] Int. Cl. ............................................ B60c 27/04
[58] Field of Search..................... 152/243, 231, 232

[56] References Cited
UNITED STATES PATENTS
3,614,971  10/1971  Muller ............................... 152/243
3,714,975  2/1973  Muller ............................... 152/243

Primary Examiner—James B. Marbert
Attorney, Agent, or Firm—Walter Becker

[57] ABSTRACT

A wear link for tire chains in which the wear link consists of a link body which may be a link of the tire chain that is disposed edgewise to the tire. The wear link also includes a wear body engaging the side of the link body facing away from the tire with the wear body presenting a road engaging surface which is preferably substantially wider than the link body. The link body and wear body have interfitting portions which hold the bodies together against relative lateral and longitudinal and tilting movements and one or more connectors is provided for fixedly interconnecting the wear body and the link body.

30 Claims, 52 Drawing Figures

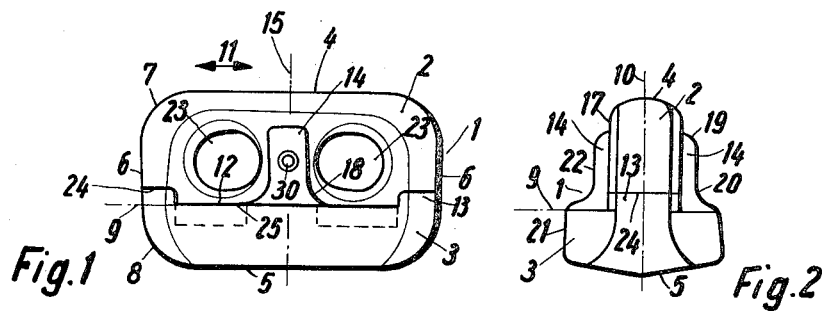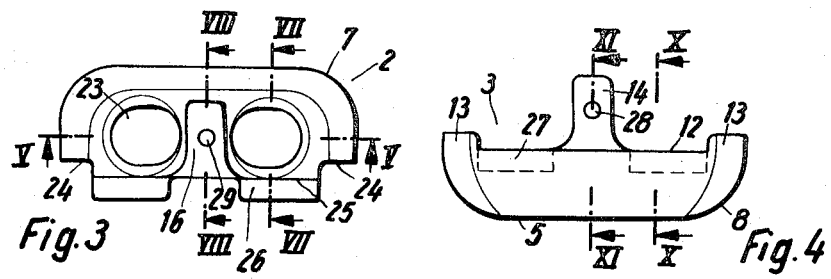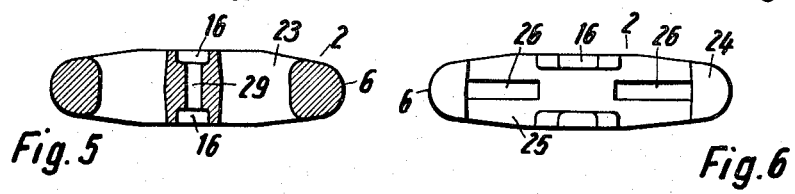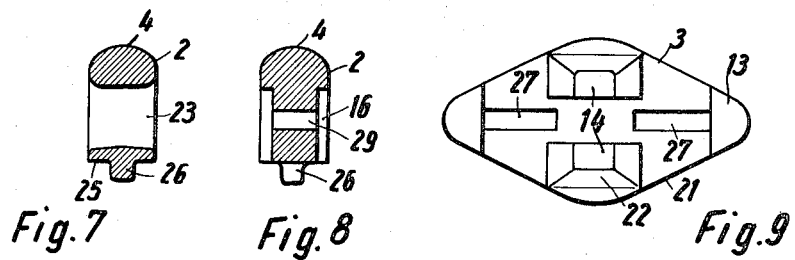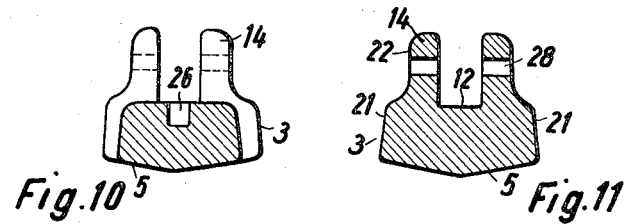

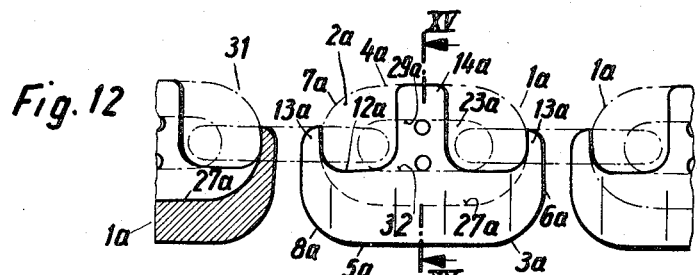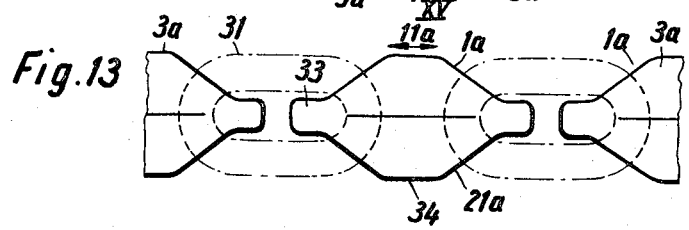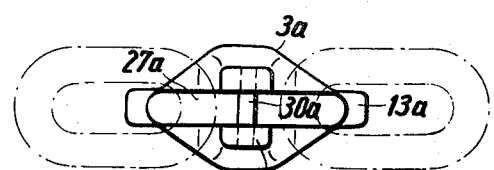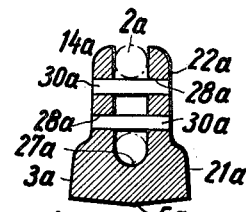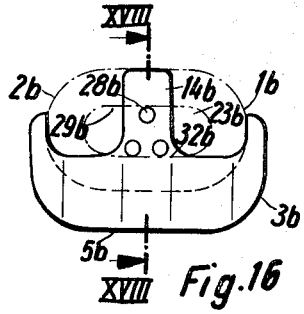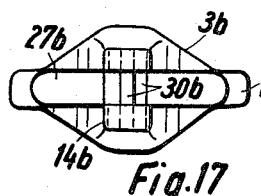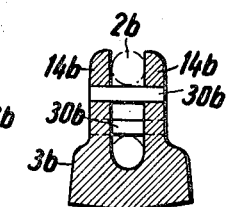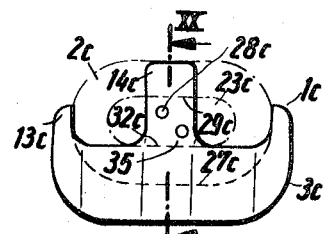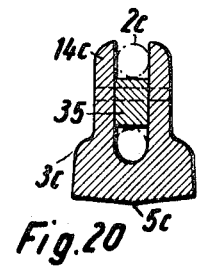

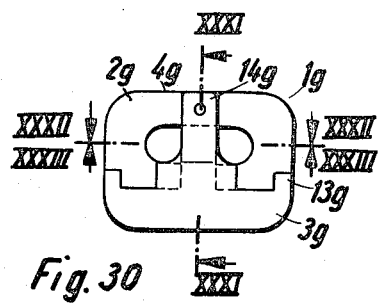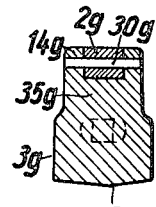
Fig. 30    Fig. 31
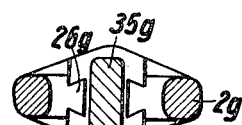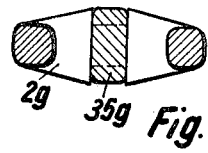
Fig. 32    Fig. 33
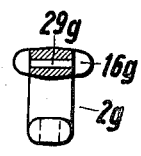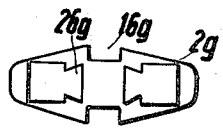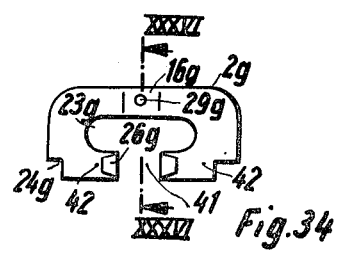
Fig. 36    Fig. 35    Fig. 34
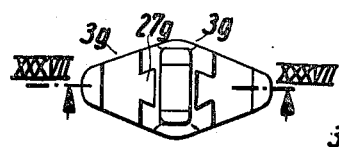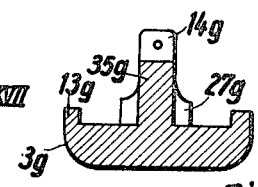
Fig. 38    Fig. 37

WEAR LINK FOR TIRE CHAINS

The present invention relates to a wear member or wear link for tire chains, especially a running link, with a link body which comprises at least one connecting member and a receiving opening for the connection of an adjacent link, while the link body has arranged thereon at least one separate wear member for contact with the road and/or tire.

Chain links have become known in which as wear bodies there are provided wear rollers. After these wear rollers have worn down, practically the entire chain link and the entire chain strand pertaining thereto become useless. Moreover, the wear rollers are suitable only for use under certain circumstances.

It is, therefore, an object of the present invention so to design a wear member of the above referred to general character that it will have a long life and that it can be adapted in a simple manner to the respective circumstances under which it is to be used.

This object and other objects and advantages of the invention will appear more clearly from the following specification in connection with the accompanying drawings, in which:

FIG. 1 is a side view of a wear link according to the present invention.

FIG. 2 shows the wear link of FIG. 1 as seen from the left-hand side of FIG. 1.

FIG. 3 shows a view of the link body of the wear link of FIGS. 1 and 2.

FIG. 4 is a view of the wear body of the wear link of FIGS. 1 and 2.

FIG. 5 represents a section taken along the line V — V of FIG. 3.

FIG. 6 shows a view of the link body according to FIG. 2.

FIG. 7 represents a section taken along the line VII—VII of FIG. 3.

FIG. 8 is a section taken along the line VIII—VIII of FIG. 3.

FIG. 9 is a top view of the wear body according to FIG. 4.

FIG. 10 is a section taken along the line X — X of FIG. 4.

FIG. 11 represents a section taken along the line XI—XI of FIG. 4.

FIG. 12 is a view of a further embodiment of a wear link according to the invention.

FIG. 13 shows a bottom view of the wear link of FIG. 12.

FIG. 14 is a top view of the wear link of FIG. 12.

FIG. 15 represents a section taken along the line XV — XV of FIG. 12.

FIG. 16 represents a side view of still a further embodiment of a wear link according to the invention.

FIG. 17 shows a top view of the wear body of FIG. 16.

FIG. 18 is a section taken along the line XVIII — XVIII of FIG. 16.

FIG. 19 is a side view of still a further embodiment of the wear link according to the invention.

FIG. 20 represents a section taken along the line XX — XX of FIG. 19.

FIG. 30 is a side view of a still further embodiment of the wear body according to the invention.

FIG. 31 represents a section taken along the line XXXI—XXXI of FIG. 30.

FIG. 32 is a section taken along the line XXXII — XXXII of FIG. 30.

FIG. 33 represents a section taken along the line XXXIII—XXXIII of FIG. 30.

FIG. 34 is a side view of the link body of the wear link of FIG. 30.

FIG. 35 is a bottom view of the link body of FIG. 34.

FIG. 36 represents a section taken along the line XXXVI — XXXVI of FIG. 34.

FIG. 37 is a section through the wear link of FIG. 30, said section beking taken along the line XXXVII — XXXVII of FIG. 38.

FIG. 38 is a top view of the wear body of FIG. 37.

Figure 21:
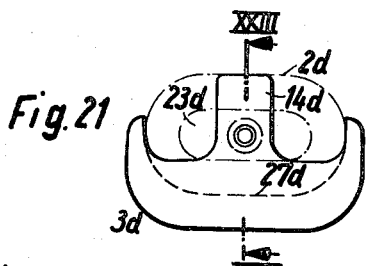
FIGS. 21 to 29 represent three further embodiments of the wear link according to the invention and being illustrated in a manner similar to that of FIGS. 16 to 18.

The wear link for tire chains according to the invention which comprises at least one connecting element and a receiving opening for connection with link bodies having adjacent links while on the link body there is arranged at least one separate wear member for contact with the road,is characterized primarily in that the wear body and the link body are exchangeably connectable. After the wear body has worn down, it can without difficulties be removed from the link body and can be replaced by a new wear body. Furthermore, it is possible, while employing one and the same link body, to produce completely different wear links by a correspondingly different design of the wear body and thereby to adapt to an optimum the wear links to the respective purpose of use.

It is advantageous so to design the wear body and link body that both form a web link with each other the position of which on the tire can be precisely predetermined so that only the wear body will contact the road.

According to a further development of the invention, the wear body is designed in a web-like manner so that a large wear volume is available. Expediently, the wear body has a greater width than the link body, preferably a multiple of the width of the link body, so that the link body is particularly well protected by the wear body and that also a relatively low weight of the wear body can be obtained.

In order to be able to get the most favorable use of the wear body over its entire height, the dividing plane between the wear body and the link body is substantially parallel to the bottom surface of the link.

In order to obtain a precise alignment of the wear body and the link body relative to each other, these two bodies are provided with interengaging positive connecting means or with centering elements. For instance, the link body may at that edge which faces the wear body, preferably between its two ends, have at least one protrusion for engagement with an opening on the wear body. Expediently, the protrusion is in the form of a web so that a minimum space requirement will have to be met. Moreover, the wear body may at at least one end have a protrusion, preferably extending to both lateral surfaces, for extension over the link body so that the link body will be protected in this region which is under particular stress. When the protrusion at the end side engages a recess of the link body, a flush merging is obtained between the wear body and the link in this area. The protrusion at the end side may, however, extend over the end edge of the link body, preferably at least to half of its height, so that a particularly effective protection is assured.

The wear body may further be equipped with at least one, preferably two, protrusions which laterally extend around the link body so that the link body is protected in a very effective manner against lateral forces. The laterally embracing protrusion may in a space saving manner engage a pocket-like recess on the link body. It is advantageous when the lateral protrusion extends approximately over the entire height of the link body so that large contact surfaces will be obtained. For example, the lateral protrusion may be designed in the form of a plate so that it will have a relatively low weight. The lateral protrusions may protrude further than the protrusions at the end sides because the lateral protrusions can affect the movability of the wear member in the chain construction. It is, however, advantageous when the lateral protrusions are set back relative to the remaining lateral surfaces of the wear body, but project forwardly preferably relative to the remaining lateral surfaces of the link body so that, on one hand, they themselves are protected while, on the other hand, they form a protection for the link body. In order to prevent soil or dirt from entering between the link body and the wear body, these two bodies are located substantially gap-free adjacent to each other.

In order to be able safely to maintain together the wear body and the link body, the wear body is by means of at least one closing member, especially a bolt, such as a spiral tensioning pin, connected to the link body. The link body may without causing any disturbance be arranged in the lateral protrusions of the wear body. The closing member may also be formed by a clamping screw by means of which the wear body can be clamped fast to the link body. It is particularly advantageous to design the lateral protrusions so as to be movable relative to each other, for instance in an elastic manner, and also so as to be adapted preferably to be clamped directly against the link body.

A design in which the lateral protrusions are movable relative to each other may, for instance, also be obtained by forming the wear body of two parts which are arranged on those sides of the link body which are located opposite to each other and thus may, for instance from the side, in a simple manner during the assembly be connected to the link body. For further simplifying the assembly, the dividing plane of the wear body is located approximately parallel to the longitudinal central plane of the wear link, preferably in the longitudinal central plane. For purposes of firmly connecting the two-sectional wear body to the link body, the two parts of the wear body may be connected to the closure member forming a tensioning element and thus may be adapted to be braced relative to each other by this clamping element by interposing the link body.

According to a simple embodiment of the invention, the two parts of the wear body are substantially of the same construction, while the wear body parts, when a clamping screw is used, merely must differ from each other in that one of the wear body parts has a bore therethrough and the other wear body part is provided with a threaded bore for the clamping screw.

However, it is also possible that exclusively one wear body part forms the bottom contacting surface while preferably the second wear body part is designed as a clamping shoe which engages a lateral recess of the first wear body part. The clamping shoe itself is thus not exposed to any or only to a slight wear and, therefore, can be used again with a further wear body part of this kind when the wear body part forming the road contacting surface has worn out. In order to assure a particularly safe connection, the clamping shoe may be of a T-shape design in which instance the transverse web of the T engages the lateral recess of the other wear body part. For purposes of simplifying the construction, the threaded bore for the clamping screw is expediently provided in the clamping shoe.

In particular when the lateral protrusions of the wear body are movable relative to each other, it is advantageous to have their inner surfaces provided with recesses for engagement with the link body so that as a result thereof, with small dimensions a particularly precise alignment of the link body relative to the wear body will be assured.

According to a further development of the invention, the road contacting surface of the wear body is in view widened toward the center of its length, especially in a diamond-shaped manner, so that a very large running surface is obtained and the closure member is supported against tilting in a particularly safe manner. The ends of the running surface may be provided with narrow extensions which preferably form the back of the protrusions at the ends whereby the movability of the wear link in the chain construction is not affected which, however, assure an additional support for the wear link on the road.

According to a simple embodiment of the invention, the preferably oblong shape of the opening in the link body is completely closed over the circumference so that also after a complete wear of the wear body, the link body cannot detach itself from the adjacent connecting links.

However, it is also possible in an advantageous manner that the receiving opening in the preferably doublehook-shaped link body has an insert opening which preferably is adapted to be closed so that the wear link can without difficulty also as a unit be detached from the tire chain or connected thereto and thus can, for instance, be used as a repair unit. The insert opening may in a particularly simple manner be closed, for instance, by the wear body when this opening is located on that side of the link body which faces the wear body. In this instance, expediently positive elements are provided for engagement with the wear body at the leg ends of the link body which define the insert opening so that in particular in this region an especially safe connection between the wear body and the link body will be assured. In order to be able with small dimensions to convey greater forces, as for instance pulling forces, onto the wear link, the positive elements are formed by undercut protrusions, such as dovetail-shaped protrusions, and recesses for receiving same, these protrusions preferably being arranged on the link body. In order to assure especially with this design a simple assembly, the direction of insertion of the positive elements is transverse, especially at a right angle, to the running plane of the wear link. Especially when the wear body is divided, it is also possible in an advantageous manner to have the insert direction of the positive elements which are provided on the leg ends of the link body located approximately at a right angle with regard to the longitudinal central plane of the wear link while preferably both wear body parts are provided with recesses for extending over the same positive elements.

Especially when the receiving opening is closed, it is expedient to have the wear body provided with at least two, preferably three, closing bolts which may engage oppositely located sides of the receiving opening of the link body and by means of which a very play-free connection of the wear body on the link body may be obtained. A particularly safe connection between the wear body and the link body is obtained when an insert member is inserted into the receiving opening of the link body, preferably an insert member which engages two oppositely located sides of the receiving opening and which is connected to the closing link on the wear body and may be so designed that it is located in a substantially play-free manner in the receiving opening. Expediently, the insert member engages the inner surface of the lateral protrusions of the wear body while it preferably has the width of this inner surface so that laterally it will nowhere extend beyond these protrusions. It is, however, also possible in an advantageous manner, especially when the wear body is divided, that the insert member forms one single piece with the wear body so that a separate insert member is not necessary.

The wear body may in an advantageous manner be so designed that it subdivides the receiving opening of the link body, preferably by means of the lateral protrusions and/or by means of the insert member, into two individual openings so that the connecting links of the wear link will be separated from each other while not contacting each other.

It is also possible in a particularly advantageous manner to form the link body by a chain strand link, especially bent out of a wire, so that it is possible to form a chain strand by providing wear bodies, for instance on every other chain strank link, and to form this chain strand into a chain with very good running properties.

According to a particularly simple embodiment of the invention, the link body forms a round link, especially designed as longitudinally extending round link. In order to assure a safe connection of the wear body, the wear body forms a receiving cup for the chain strand link.

Referring now to the drawings in detail and, more specifically, to FIGS. 1 to 11 thereof, these figures show a wear link 1 according to the invention which comprises a link body 2 and a closure body 3. Link body 2 and closure body 3 together form a web link of which one longitudinal edge 4 designed as tire engaging surface is formed by the link body 2 while that surface 5 thereof which faces away from the longitudinal edge 4 and serves as ground contacting surface is formed by the wear body 3. The tire engaging surface 4 is in cross section curved convexly along a portion of a circle whereas the ground contacting surface 5 is preferably formed by two individual surfaces which meet each other in the manner of a roof at an acute angle and which intersect along the longitudinal central plane of the link. The areas where the surfaces 4, 5 merge with the end edges 6 of the wear body 1 are rounded at 7, 8 and follow a quarter of a circle. The rounded portions 8 of the wear body 3 have a greater radius then the rounded portions 7 of the link body 3.

The dividing plane 9 between the link bodies 2 and the wear body 3 is located primarily at a right angle with regard to the longitudinal central plane 10 of the wear link 1 and parallel to the longitudinal direction thereof as indicated by the arrow 11. The height of the wear area of the wear body 3 is less than the height of the link body 2 while, however, the wear body 3 has protrusions 13, 14 which protrude beyond the edge 12 facing the link body 2. The laterally oppositely located protrusions 14 of the protrusions 13, 14 extend over more than half the total height of the wear link 1 and have a length which is greater than the height of the wear part proper of the wear body 3. The lateral protrusions 14 which are located symmetrically with regard to the central plane 15 of the wear link 1, which central plane 15 extends at a right angle to the longitudinal central plane 10, engage lateral pocket-shaped recesses 16 of the link body 2. The lateral protrusions 14 substantially completely fill in these recesses 16 and laterally protrude beyond the lateral surfaces 17 of the link body 2. The lateral protrusions 14 merge through concavely rounded sections 18 extending over a quarter of a circle with the respective pertaining edge 12. Furthermore, the outer surfaces of the lateral protrusions 14 merge through convexly rounded sections 19 extending over a quarter of a circle and provided in the end surfaces of the protrusions 14 with the lateral surfaces 21 of the wear part proper of the wear body 3. Similarly, the outer surfaces of the lateral protrusions 14 merge through S-shaped rounded sections 20 with the lateral surfaces 21 of the wear part proper of the wear body 3. With regard to these lateral surfaces 21, the outer surfaces 22 of the lateral protrusions 14 are set back.

In the link body 2 and extending in the longitudinal direction indicated by the arrow 11 there are provided two oval receiving openings 23 which are arranged one behind the other. These openings 23 are exposed which means are not covered in any way by the wear body 3. Between these receiving openings 23 there are located the lateral protrusions 14 of the wear body 3. The protrusions 13 located at the ends of the wear body 3 engage angle-shaped recesses at the ends of the link body 2 in such a way that end edges 6 of the wear link 1 are obtained which extend all the way through. The link body 2 has its edges 25 which face the wear body 3 provided with two web-like protrusions 26 which when viewed in longitudinal direction of the link as indicated by the arrow 11 are located one behind the other and which are narrower than the edges 25. These protrusions 26 respectively extend to the pertaining recess 24 at the end side and are spaced from each other by a distance which corresponds approximately to the length of one of the protrusions 26. These protrusions 26 engage recesses 27 at the abutting surface 12 of the wear link 3 and substantially completely fill these recesses 27. In view of the described positively engaging and centering links, a safe connection of the two bodies 2, 3 with each other is assured.

The two lateral protrusions 14 of the wear body 3 are provided with aligned bores 28 which register with a corresponding bore 29 in the link body 2. A spiral tensioning pin 30 is pressed into the bores 28, 29. By means of this pin 30, the bodies 2, 3 designed as plug elements are in plugged-in condition connected to each other. The plug-in direction of the two plug elements 2, 3 extends at a right angle with regard to the dividing plane 9.

The width and the thickness of the link body 2 is considerably less than the width and thickness of the wear body 3. The link body 2 forms a flat web and tapers in the direction toward the end edges as shown in FIGS. 5 and 6. The wear part proper of the wear body 3 is more than twice as wide as the link body 2. The wear part proper, when viewed according to FIG. 9, has a diamond shape to that a diamond-shaped ground conducting surface with rounded corners is obtained. The wear link 1 is symmetrical with regard to the longitudinal central plane 10 and also is symmetrical with regard to the central plane 15 which extends at a right angle to the longitudinal central plane 10. When the wear link 1 is wearing off, it is possible by means of the protrusions 26 engaging the recesses 27 immediately to ascertain the maximum wear condition of the wear body 3. This is due to the fact that the protrusions 26 become visible on the running side of the wear link 1. When the protrusions 26 in this instance are only slightly worn, this condition will not affect the ability of the link body 2 to function which link body 2, after removal of the worn wear body 3 can be provided with a new wear body.

Referring now to FIGS. 12 to 15, the elements corresponding to those of FIGS. 1 to 11 have been designated with the same reference numerals as in these last mentioned figures but with the additional character $a$. More specifically, with the embodiment shown in FIGS. 12 to 15 of a wear link $1a$, the link body is formed by an oval link $2a$ of a chain strand 31 which is composed of identical chain links $2a$. Every other chain link of this chain strand 31 is provided with a wear body $3a$. The lateral protrusions $14a$ of the wear body $3a$ extend to that edge $4a$ of the oval link $2a$ which faces away from the bottom surface $5a$. The said protrusions thus likewise form a part of the tire engaging surface of the wear link $1a$. Furthermore, the lateral protrusions $14a$ subdivide the oval receiving opening $23a$ of the link body $2a$ into two individual openings so that the two chain links which engage the respective wear link $1a$ are separated from each other. The protrusions $13a$ at the ends extend over the ends of the link body $2a$ by more than half the height of said link body and form the end edges $6a$ proper of the wear link $1a$. The end edges $6a$ of adjacent wear links $1a$ are spaced from each other by a sufficient distance. The longitudinal edges $12a$ of the wear body $3a$ beyond which the protrusions $13a$, $14a$ extend are located approximately at the same height or level as that confining edge $32a$ of the receiving opening $23a$ which faces the bottom surface $5a$ so that at the maximum height of the wear body $3a$ there is nevertheless assured a good articularity of the chain links engaging the wear member.

The inner surface $26a$ of the cap-shaped wear body $3a$ forms a receiving cup $27a$ for the link body $2a$. The link body $2a$ engages this inner surface $27a$ substantially over its entire surface. With the illustrated embodiment, the link body $2a$ is bent out of round steel while the ends of the bent round steel piece are butt welded to each other. In the lateral protrusions $14a$ of the wear body $3a$ there are provided two bores $28a$ arranged one above the other for the spiral tensioning pins $30a$. Each of these pins engages along its circumference one of the two longitudinal confining edges $29a$, 32 of the receiving opening $23a$ of link body $2a$, the longitudinal confining edges $29a$, 32 being located opposite to each other. The arrangement is such that the link body $2a$ and the wear body $3a$ are connected to each other in a substantially play-free manner.

According to the embodiments illustrated in FIGS. 12 to 15, the wear body $3a$ has its ends provided with narrow extensions 33. The back surfaces of the extensions 33 which are provided with rounded portions $18a$ form the back surfaces of the protrusions $13a$ at the ends. The wear body $3a$ is relative to the embodiment of FIGS. 1 to 11 extended in the longitudinal direction of the link (arrow $11a$) in such a manner that in addition to the diamond-shaped lateral surfaces $21a$ there are formed two parallel lateral surface sections 34.

Referring now to the embodiment of FIGS. 16 to 18, those elements which correspond to the same elements of FIGS. 1 to 11 have been designated with the same reference numerals as in FIGS. 1 to 11 but with the additional character $b$. According to FIGS. 16 to 18, with the wear link $1b$, in the lateral protrusions $14b$ of the wear body $3b$ there are provided three bores $28b$ which are located at the ends of an imaginary acute angled triangle and are intended for receiving the spiral tensioning pins $30b$. Two of the tensioning pins $30b$ are arranged adjacent to each other and engage those longitudinal confining edges $32b$ of the receiving opening $23b$ of the link body $2b$ which face toward the bottom running surface $5b$. The third pin $30b$ engages the oppositely located longitudinal confining edge $29b$.

FIGS. 19 and 20 illustrate a further embodiment of a wear link according to the invention. In these figures, those elements which correspond to those of FIGS. 1 to 18 have been designated with the same reference numerals as in FIGS. 1 to 18 but with the additional character $c$. As will be seen from FIGS. 19 and 20, the link body $2c$ is formed by an oval member or link. Inserted into the receiving opening $23c$ of the link $2c$ is a plate-shaped insert member 35 which has such a height that it rests against the oppositely located longitudinal confining edges $29c$, $32c$ of the receiving opening $23c$. The thickness of the insert plate 35 is only slightly less than the free distance between the lateral protrusions 14c of the wear body 3c. The width of the insert plate 35 substantially equals the width of the protrusions 14c. *Prior to the insertion of the link body 2c, the insert plate 35 is introduced into the receiving opening 25c* whereupon the link body 2c is inserted into the cup surface 27c of the wear body 3c in such a way that the insert plate 35 will be located between th lateral protrusions 14c. The wear plate 35 has at least one, preferably two, bores which are offset with regard to each other along an incline and which register with corresponding bores 28c in the lateral protrusions 14c. The plate or plates 35 are provided for receiving spiral tensioning pins by means of which the three parts 2c, 3c, 35 are secured relative to each other in a substantially play-free manner.

Figure 23:
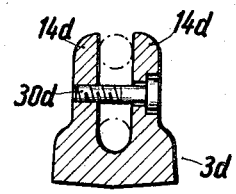
Figure 22:
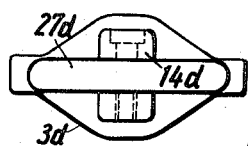

Referring now to the embodiment of FIGS. 21 to 23, the elements illustrated therein and corresponding to those of the preceding figures have been designated with the same reference numerals but differ in the affix d. More specifically, the embodiment of FIGS. 21 to 23 comprises as closure member a screw bolt 30d which is preferably formed by a cylindrical screw with an inner hexagon. In one of the lateral protrusions 14d there is provided a passage with a bore for the head of the clamping screw 30d. In the oppositely located protrusion 14d of the wear body 3d there is provided a threaded bore for the clamping screw 30d. The two lateral protrusions 14d are in view of their relatively great length and in view of the cup-shaped design of the wear body 3d elastically movable relative to each other so that by means of the clamping screw 30d located approximately in the center of the receiving opening 23d of the link body 2d the two lateral protrusions 14d can be clamped against the lateral surfaces of the link body 2d.

Figure 24:
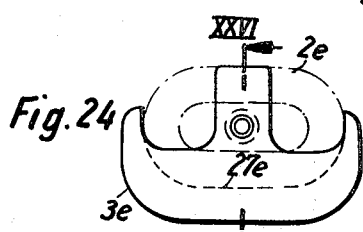
Figure 26:
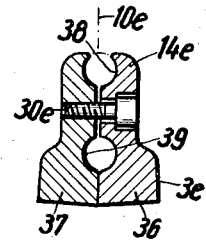
Figure 25:
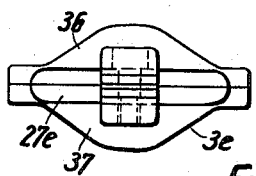

As will be evident from FIGS. 24 to 26, the wear body 3e may consist also of two parts 36, 37 the dividing plane of which is located in the longitudinal central plane of the wear link, the two parts being substantially so designed as to form an image to each other while being arranged symmetrically with regard to the dividing plane. The only difference consists in that for the clamping screw 30e there is provided in the wear body part 36 a passage with a bore for the screw head whereas in the other wear body part 37 there is provided a threaded bore. The lateral surfaces of the cup-shaped recess 27e of the wear body comprises groove-shaped depressions 38, 39. Each two oppositely located depressions 38, 39 have approximately a circular cross section. The longitudinal webs of the link body 2e formed according to this embodiment by an oblong link are located in the depressions 38, 39. The depressions 38, 39 are provided solely within the region of the lateral protrusions. The other elements shown in FIGS. 24 to 26 have the same reference numerals as in the preceding figures, but differ with regard to the affix e.

Figure 27:
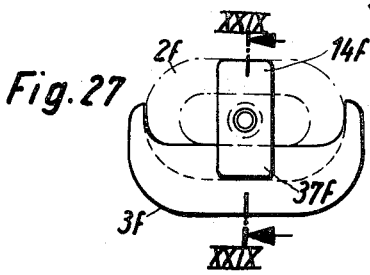
Figure 29:
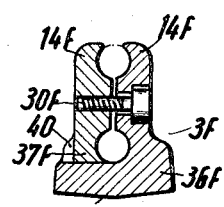
Figure 28:
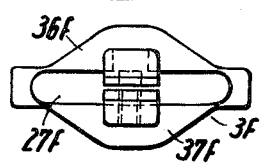
Figure 39:
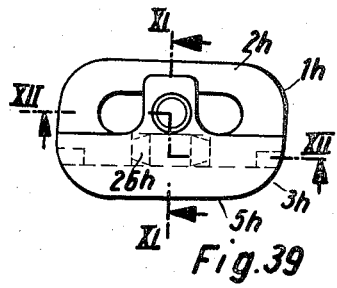
FIG. 39 is a side view of still another embodiment of a wear link according to the invention.
Figure 40:
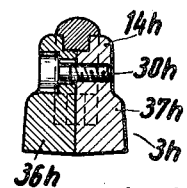
FIG. 40 represents a section taken along the line XL — XL of FIG. 39.
Figure 41:
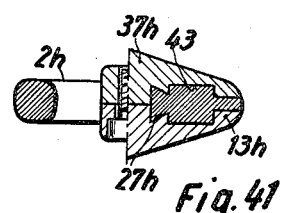
FIG. 41 is a section taken along the line XLI — XLI of FIG. 39.
Figures 45, 46:
FIG. 45 is a section taken along the line XLV — XLV of FIG. 44.
FIG. 46 shows a cross section of the outer wear body part according to FIG. 40.
Figure 43:
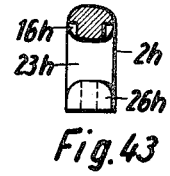
FIG. 43 is a section taken along the line XLIII — XLIII of FIG. 42.
Figure 42:
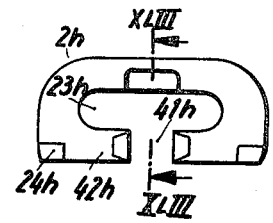
FIG. 42 is a sice view of the link body of the wear link according to FIG. 39.
Figure 44:
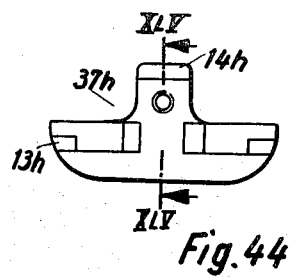
FIG. 44 shows one of the two wear body parts of the wear link according to FIG. 39 when looking upon the inner side.
Figure 47:
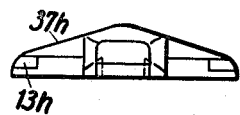
FIG. 47 is a top view of the wear body part according to FIG. 44.

FIGS. 27 to 29 likewise illustrate a wear member 1f the wear body 3f of which comprises two parts 36f, 37f. The bottom surface 5f of the wear member is, however, formed exclusively by one of the two closure body parts, namely by the closure body part 36f which has its corresponding side surface provided with a recess 40 for engagement with the other clamping shoe-shaped wear body part 37f. The clamping shoe 37f in which is provided the threaded bore for the clamping screw 30f is, when seen in side view, of a rectangular shape as shown in FIG. 27. The clamping shoe 37f forms one lateral protrusion 14f of the wear body 3f and is of substantially the same shape as the oppositely located protrusion 14f. The other elements in FIGS. 27 to 29 have been designated with the same reference numerals as in the preceding figures but differ therefrom in the affix f.

FIGS. 30 to 37 have those elements which correspond to FIGS. 1 to 11 designated with the same reference numerals but with the additional character g. FIGS. 30 to 37 show a wear member 1g the link body 2g of which is, in conformity with FIG. 4, double hook-shaped so that the receiving opening 23g of the link body has an insert opening 41. This opening 41 is formed by an interruption of that longitudinal web of the link body 2g which faces toward the wear body 3g. The arrangement is such that the said longitudinal web forms two free protruding legs 42 which extend toward each other and which confine the insert opening 41. The ends of the legs 42 form dovetail-shaped protrusions which engage correspondingly shaped dovetail-like recesses 27g on the wear body 3g. The arrangement is such that the insert opening 41 is with the wear member 1g assembled, closed by the wear body 3g. The plug-in direction of the dovetails 26g, 27g is located at a right angle with regard to the running plane of the wear member 1g which running plane is defined by the bottom surface 5g.

The lateral protrusions 14g of the wear body 3g have their ends provided with an insert member 35g which forms one piece with the wear body 3g and in assembled condition of the wear link 1g is so located in the receiving opening 23g thereof that this opening 23g is subdivided into two individual openings. The dovetail-shaped grooves or the like 27g are provided on the lateral flanges of this insert member 35g. The lateral receiving pockets 16g for the protrusions 14g of the wear body 3g are provided on the longitudinal web of the link body 2g which web is located opposite the insert opening 41. The bore 29g for the closure bolts is located in the pocket-shaped receiving openings 16g. The longitudinal web of the link body 2g which web is located opposite the insert opening 41 is in conformity with the embodiment of FIGS. 30 to 38 likewise widened toward the center of its length but to a lesser degree than the wear body 3g while the longitudinal web as seen in FIG. 35 is approximately diamond-shaped.

Referring now to FIGS. 39 to 47, th elements shown therein and corresponding to those of FIGS. 1 to 11 have been designated with the same reference numerals as in FIGS. 1 to 11 but with the additional character h. More specifically, the link body 2h has likewise a double-hook-shaped design. The wear body 3h is, however, formed by two parts 36h, 37h which are clamped by a clamping screw 30h against the link body 2h. Adjacent to the lateral protrusions 14h, recesses 43 of the rectangular cross section are provided for engagement by legs 42h of the link body 2h which legs have rectangular intermediate sections. The recesses 42 are arranged in those inner surfaces of the wear body parts 36h, 37h which face each other. The wear body parts 36h, 37h have protrusions 13h for engaging corresponding recesses 24h of the link body 2h. The two wear body parts 36h, 37h rest against each other up to the inner surface of the receiving opening 23h so that they form an insert member which divides the receiving opening 23h into two individual openings, the inner surface being located opposite to the insert opening 41h.

Figure 48:
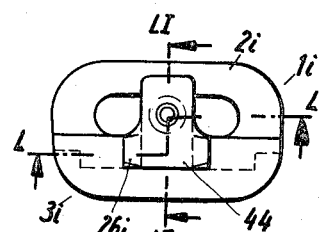
FIG. 48 is a side view of still another embodiment of a wear link according to the invention.
Figure 49:
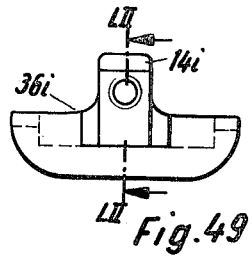
FIG. 49 is a larger wear body part of the wear link according to FIG. 48 when looking upon the inner side.
Figure 50:
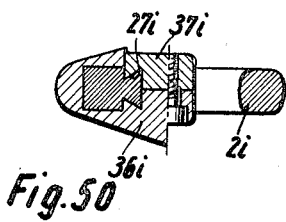
FIG. 50 represents a section taken along the line L — L of FIG. 48.
Figure 52:
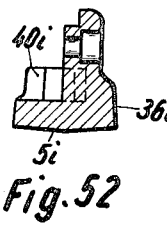
FIG. 52 represents a section taken along the line LII — LII of FIG. 49.
Figure 51:
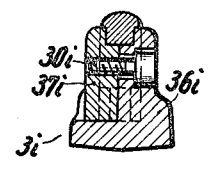
FIG. 51 is a section taken along the line LI — LI of FIG. 48.

The embodiment of FIGS. 48 to 52 likewise employs the same reference numerals as FIGS. 1 to 11 for corresponding elements, but with the additional character i. The wear member 1i shown in FIGS. 48 to 52 likewise is a double-hook-shaped link body 2i. However, the wear body 3i, similar to the embodiment of FIGS. 27 to 29, comprises two different wear body parts 36i, 37i. The wear body part 37i forming a clamping shoe is, as seen in FIG. 48, of a T-shaped contour while the transverse web of the T-shaped part is located in the lateral recess 40i of the other wear body part 36i which forms the bottom running surface 5With the two embodiments according to FIGS. 39 to 52, each wear body part comprises approximately half of each recess 27h, 27i for the positive elements 26h, 26i arranged on the leg ends of the closure body 2h, 2i.

The wear link according to the invention may be provided for the running part as well as for the lateral parts of a tire chain, for instance, of a tire protective chain or an antiskid chain.

In view of the design according to the present invention, the fundamental framework is exposed only to an inner wear so that the web will have a longer life span and can be employed a plurality of times while the tire chain can be regenerated by exchanging the wear bodies. Furthermore, it is possible to design the link body proper of another material which is less expensive than the material employed for the wear body. For the wear body itself there may be employed a material which is highly wear resistant. The selection in this connection is much more favorable than with heretofore known links of the type involved and, for instance, chilled cast iron may be employed.

In view of the design according to the invention, the welding-on customary with heretofore known tire chains will be superfluous. Furthermore, more favorable heat treating possibilities offer themselves so that, for instance, the connecting rings of the wear links may be exposed to other heat treatments than the link bodies and the wear bodies. The design according to the present invention makes it possible to produce a single type of a base net and then by a selective employment of different wear bodies to mount the tire chain in conformity with the respective requirements to be met so that a considerable rationalization will be obtained in connection with the manufacture of tire chains. A great number of combination possibilities offers itself with regard to the design of the running and lateral parts of the tire chain. With the particularly simple design of the subject matter according to the invention, the wear body may also be used in connection with round steel chains so that the base net of the tire chain is formed merely by round steel elements.

If the exchangeable web parts serve as wear members and also as closure members, the tire chain may be produced, for instance, in such a way that the closure members or links are connected with each other or with connecting links in any desired arrangement. Furthermore, particularly in this instance, the elements are easily exchangeable and repaired.

The link bodies and/or the plug elements adapted to be placed thereon may also serve for connecting other devices, such as transport elements, to round steel chains.

It is, of course, to be understood that the present invention is, by no means, limited to the particular showing in the drawings but also comprises any modifications within the scope of the appended claims.

What is claimed is:

1. A wear link for a tire chain; said link being at least one connection element and having aperture means as a receiving opening for connection thereof to adjacent links of the chain and being adapted to be disposed edgewise to the tire, said link comprising a link body on that side thereof nearest the tire, said link body having a first longitudinal surface facing the tire, said link comprising web-formed exchangeable wear body providing a tire engaging surface and a running surface on that side thereof remote from the tire, said wear body having the running surface as a second longitudinal surface facing away from the tire in essence to form the running surface in entirety and means detachably connected said wear body to said link body.

2. A wear link according to claim 1 in which said link body and wear body when connected together form a web link of said chain.

3. A wear link according to claim 1 in which said wear body is substantially wider than said link body when the link is viewed in transverse cross section.

4. A wear link according to claim 1 in which the plane of separation between said link body and wear body is substantially parallel to said second longitudinal surface.

5. A wear link according to claim 1 in which said link body and wear body include cooperating elements of interengageable means to locate said wear body on said link body.

6. A wear link according to claim 1 in which said wear body is cap-like and fits about a portion of said link body.

7. A wear link according to claim 1 which includes web-like protrusion means on said link body facing said wear body, and said wear body is formed with recess means to receive said protrusion means.

8. A wear link according to claim 1 in which said wear body comprises portions at the ends projecting toward the tire side of the link and said link body is formed with notches in the ends to receive said portions.

9. A wear link according to claim 1 in which said link body has recesses formed in the side walls between the link body, and said wear body having bar-like portions which fit into said recesses when the wear body is mounted on the link body.

10. A wear link according to claim 1 in which said wear body has upstanding portions at the opposite ends and said link body is notched at the ends to receive said portions, said link body having recesses formed in the side walls between the ends of the link body, said wear body having bar-like projections fitting in said recesses, said second longitudinal surface being substantially wider than sald link body, said upstanding portions of said wider body being about the same width as said link body, and the outwardly facing sides of said bar-like projections being spaced apart a distance less than the width of said second longitudinal surface but more than the width of said upstanding portions.

11. A wear link according to claim 1 in which said link body and wear body bear on each other over substantially the full length thereof.

12. A wear link according to claim 1 in which said link body has recesses formed in the side walls between the ends of the link body, said wear body having bar-like portions which fit into said recesses when the wear body is mounted on the link body, and connector means extending through said link body and said bar-like portions of said wear body and connecting said wear body to said link body.

13. A wear link according to claim 12 in which said bar-like portions are yieldable in the lateral direction of said link.

14. A wear link according to claim 1 in which said wear body is formed in lateral parts abutting in substantially the central longitudinal plane of said link body and clampingly engaging said link body.

15. A wear link according to claim 14 in which said second longitudinal surface is formed on one of said lateral parts, said one part being notched on the side nearest said link body to receive the others of said lateral parts, the sides of said parts facing each other being formed to engage said link body, and means clamping said parts together and in clamping relation to said link body.

16. A wear link according to claim 15 in which the opposed sides of said parts are recessed to receive said link body, said second longitudinal surface widening toward the longitudinal center of the wear body from each end of the wear body, said wear body at the ends extending over the ends of said link body.

17. A wear link according to claim 1 in which said aperture means comprise circumferentially closed apertures in said link body.

18. A wear link according to claim 1 in which said aperture means comprises aperture means in said link body which open on the side facing said wear body, and said wear body closing the open side of said aperture means.

19. A wear link according to claim 1 in which said aperture means comprises an elongated aperture in said link body having a central opening on the side facing said wear body, said link body on opposite sides of said opening and said wear body being formed with cooperating elements of interengageable means which interfit when the wear body is mounted on the link body.

20. A wear link according to claim 19 in which said cooperating elements comprise dovetail means on one of said bodies and dovetail groove means on the other of said bodies, said dovetail means and groove means extending perpendicular to said second longitudinal surface.

21. A wear link according to claim 1 in which said link body is a circumferentially closed elongated link having side legs and curved ends, said wear body embracing one side leg of said link body and having bar-like extensions disposed on opposite sides of said link body in about the middle of the length thereof, an insert block fitting between the opposed sides of the side legs of said link body and between the opposed faces of said extensions, and connector means extending through said extensions and said insert block.

22. A wear link according to claim 1 in which said link body is a circumferentially closed elongated link having side legs and curved ends, said wear body embracing one side leg of said link body and having bar-like extensions disposed on opposite sides of said link body in about the middle of the length thereof, said extensions dividing the opening of the link body, into two portions, and means fixedly connecting said wear body to said link body.

23. A wear link according to claim 1 in which said aperture means is formed in said link body and comprises a confining edge on the side nearest said wear body, said wear body having the side nearest said link body in about the same plane as said confining edge of said aperture means.

24. A wear link according to claim 1 in which at least said wear body is formed of a wear resistant material, said aperture means comprising a pair of apertures in said link body spaced in the longitudinal direction of the link body.

25. A wear link according to claim 1 in which said link body is in the form of a conventional chain link having parallel side legs and rounded ends.

26. A wear link according to claim 25 in which said link body is formed of round material.

27. A wear link according to claim 26 in which said wear body is formed with a recess on the side facing said link body which is complementary in shape to the opposed side of the link body.

28. A wear link according to claim 1 in which said link body and wear body are symmetrical with reference to the longitudinal central plane of the link.

29. A wear link according to claim 1 in which said link body and wear body are symmetrical with reference to the transverse central plane of the link.

30. A wear body adapted for incorporation in an anti-skid tire chain, said chain including links which are edgewise to the tire on which the chain is mounted, said wear body having a recess formed in one side to receive a said link and having a roadway engaging surface on the other side.

* * * * *

UNITED STATES PATENT OFFICE
CERTIFICATE OF CORRECTION

Patent No. 3,799,232     Dated March 26, 1974

Inventor(s) Werner Schurle

It is certified that error appears in the above-identified patent and that said Letters Patent are hereby corrected as shown below:

On the cover sheet [75] "Werner Schnürle" should read -- Werner Schürle --.

Signed and sealed this 24th day of September 1974.

(SEAL)
Attest:

McCOY M. GIBSON JR.          C. MARSHALL DANN
Attesting Officer            Commissioner of Patents